US006305640B1

United States Patent
Bansemir

(10) Patent No.: US 6,305,640 B1
(45) Date of Patent: Oct. 23, 2001

(54) SPRING COMPONENT AND SUPPORT BEARING FOR HELICOPTER TAIL ROTORS AND SUPPORT STRUCTURE FOR USE IN OUTER SPACE

(75) Inventor: Horst Bansemir, Munich (DE)

(73) Assignee: Eurocopter Deutschland GmbH, Munich (DE)

( * ) Notice: Subject to any disclaimer, the term of this patent is extended or adjusted under 35 U.S.C. 154(b) by 0 days.

(21) Appl. No.: 09/341,195

(22) PCT Filed: Oct. 20, 1998

(86) PCT No.: PCT/DE98/03055

§ 371 Date: Aug. 16, 1999

§ 102(e) Date: Aug. 16, 1999

(87) PCT Pub. No.: WO99/22990

PCT Pub. Date: May 14, 1999

(30) Foreign Application Priority Data

Nov. 4, 1997 (DE) ............................................... 197 48 682

(51) Int. Cl.[7] .............................. F01D 5/00; B64C 27/32; B64G 1/22
(52) U.S. Cl. .................................... 244/17.21; 244/17.11; 244/158 R; 416/134 A; 384/37
(58) Field of Search .............................. 244/17.11, 17.27, 244/158 R, 17.21; 416/134 R, 134 A; 384/37

(56) References Cited

U.S. PATENT DOCUMENTS 3,797,964 * 3/1974 Hanson ............................ 416/134 R
4,533,100 * 8/1985 Paseri ................................ 244/158 R
4,541,777   9/1985 Sampatacos .

FOREIGN PATENT DOCUMENTS 0351577   1/1990 (EP) .
0351578   1/1990 (EP) .

OTHER PUBLICATIONS

"Development of Bearingless Tail Rotors", Huber et al., Two Day International Conference on Helicopter Yaw Control Concepts, Feb. 28, 1990, London, England.

* cited by examiner

Primary Examiner—Robert P. Swiatek
(74) Attorney, Agent, or Firm—W. F. Fasse; W. G. Fasse

(57) ABSTRACT

A spring component for support bearings of helicopter tail rotors or for support structures for use in outer space encompasses at least two contact support components (11a, 11b) for connecting with the members that are to be supported (e.g. a belt and a control sleeve of a helicopter tail rotor), as well as a web plate (20), which extends between the contact support components (11a, 11b) and which includes a pair of lengthwise webs (21a, 21b) extending in a longitudinal direction. The lengthwise webs are connected to each other by first connecting webs (22a, 22b). Respectively, a further connecting web (23a, 23b) is arranged at a section of the two lengthwise webs (21a, 21b) positioned between the first connecting webs (22a, 22b), wherein each further connecting web extends outwardly toward one of the support components (11a, 11b). In connection with a transverse bending moment acting on the spring component, a twisting of the lengthwise webs (21a, 21b) takes place. The spring component is flexible for transverse bending and comprises a high supporting force. A support bearing for a helicopter tail rotor or a support structure for use in outer space encompasses two or more of the spring components. In a control sleeve bearing of a helicopter tail rotor the belt is held in the control sleeve between two oppositely positioned spring components.

24 Claims, 7 Drawing Sheets

Fig.3
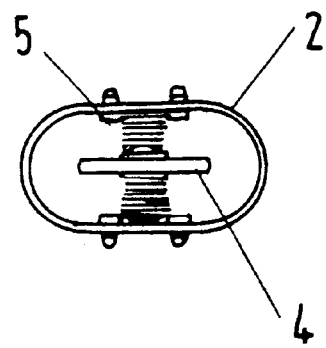
PRIOR ART
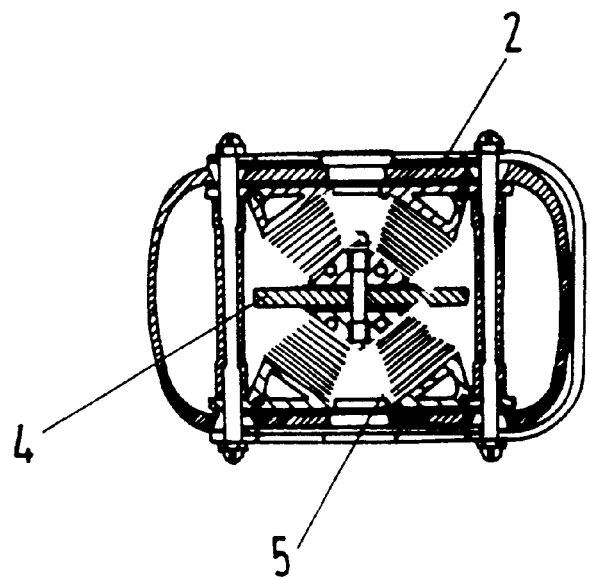
Fig.4
PRIOR ART

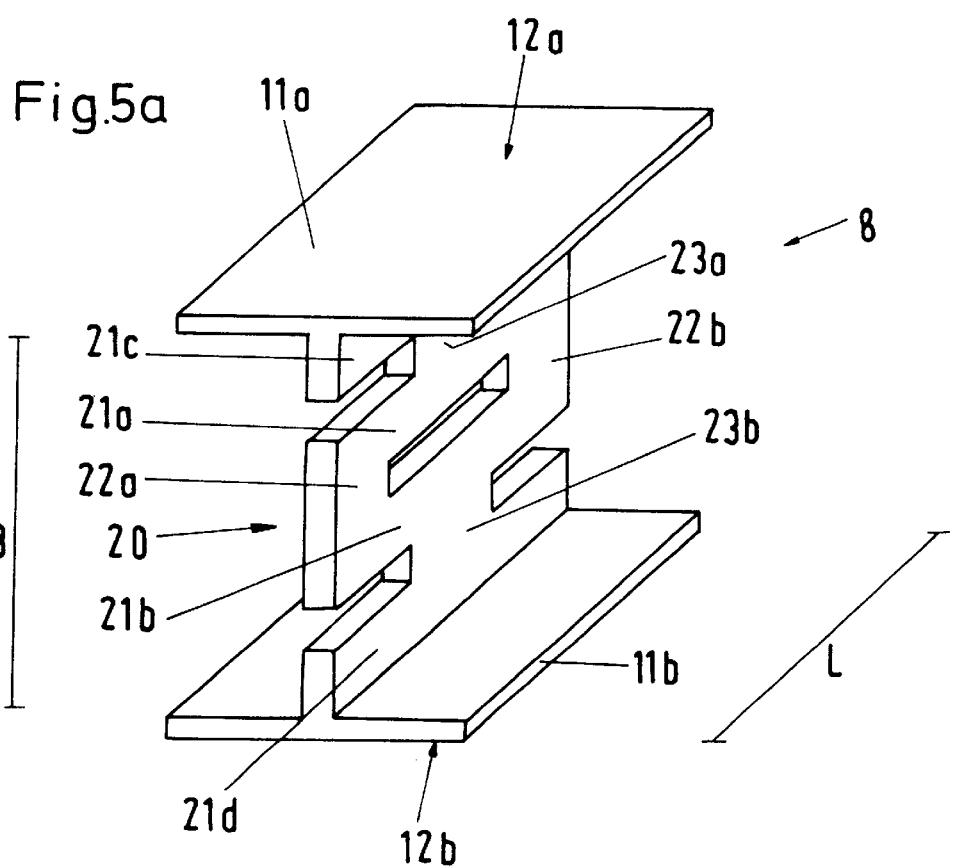
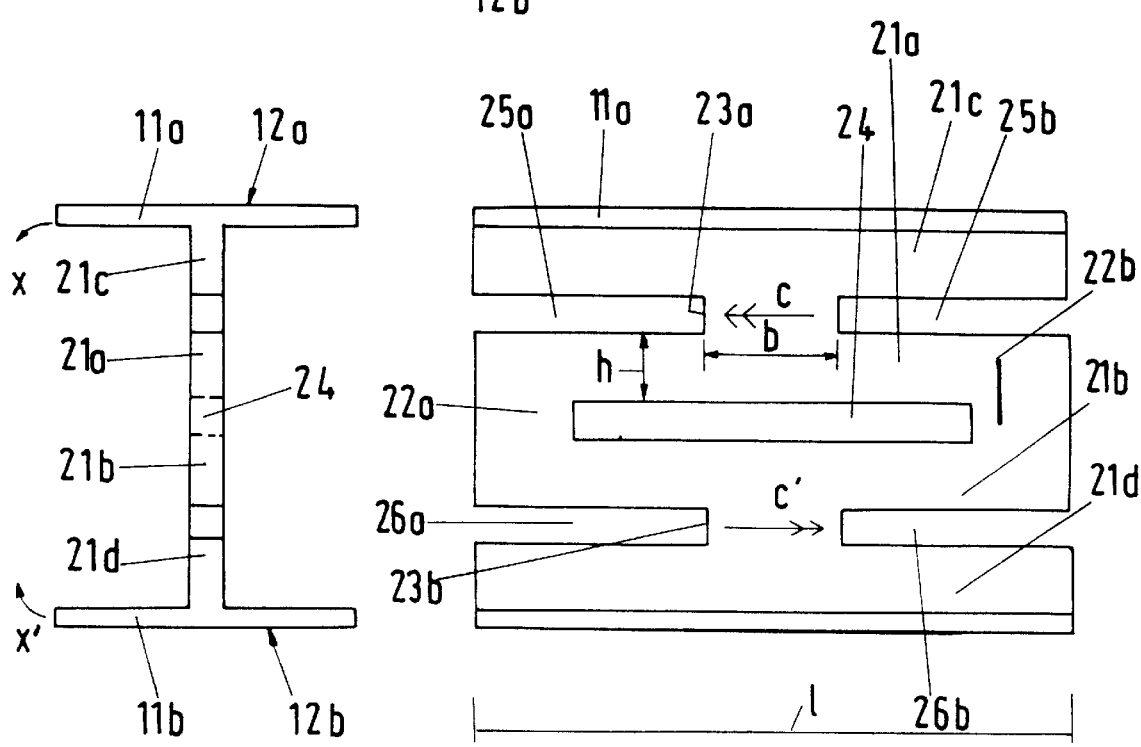

SPRING COMPONENT AND SUPPORT BEARING FOR HELICOPTER TAIL ROTORS AND SUPPORT STRUCTURE FOR USE IN OUTER SPACE

FIELD OF THE INVENTION

The present invention relates to a spring component for support bearings, particularly of helicopter tail rotors, as well as a support bearing for a helicopter tail rotor or for a support structure for use in outer space.

BACKGROUND INFORMATION

Support bearings with elastic components are used specially in construction of helicopter rotors. Bearingless tail rotors of helicopters essentially comprise belts which are fastened to the rotor mast with a few bolts. The belts run inside of rotor blades, of which the ends on the side of the rotor mast comprise a control sleeve. The torsion of the rotor blades required for control purposes is attained through a torsion of the control sleeve. The belts give the tail rotor the required strength and they are elongated through the centrifugal force and bending moments arising during the rotation. A twisting of the belt by up to about 25° takes place in connection with a rotating of the rotor blade by means of the control sleeve. In connection therewith a relative torsion between the control sleeve and the belt must be guaranteed and at the same time the sleeve must be supported in the transverse direction, i.e. in the flapping direction of the rotor. The connection between the belt and the control sleeve is provided by a support bearing, through which the belt is held in the control sleeve. Through the strong centrifugal and bending forces, which arise at this location of the rotor, the support bearings are exposed to high loads.

Typically, elastomer bearings are used as support bearings, of which the contact support components are made out of layers of titanium or steel plates, between which respectively an elastic material, for example rubber, is located. The belt is held in the middle of the control sleeve between oppositely lying elastomer bearing components. Due to the strong loads, special materials must be used for such type of elastomer sleeve support bearing and moreover, they must comprise a special structure to withstand the loads. These known elastomer bearings are therefore extremely costly, since they require a cost intensive development and manufacture. Moreover they comprise the disadvantage, that they change their stiffness and their material properties at different temperatures. The results are a reduced service life due to additional arising stresses.

To reduce manufacturing costs in the serial production of helicopter tail rotors, it was tried in new developments to substitute the elastomer bearings by twistable supports. Such a concept is described in "DEVELOPMENT OF BEARINGLESS TAIL ROTORS", Huber et al. Two day International Conference on Helicopter Yaw Control Concepts, Feb. 28, 1990, London. In such contact support components, likewise very high additional stresses arise in the contact support component in connection with a relative twisting of belt, however, which leads to premature material fatigue and increased cracking danger. The service life of conventional support bearings in the area of helicopter tail rotors is thus limited and can be held in a reasonable range only through expensive material compositions.

SUMMARY OF THE INVENTION

It is therefore the object of the present invention, to overcome the above mentioned disadvantages and to provide a spring component for support bearings and a support bearing for helicopter tail rotors and support structures, in which the manufacturing costs are reduced and a secure and durable, movable bearing support of components with a high supporting force is guaranteed.

This object is achieved by the spring component and the support bearing according to the invention.

The spring component according to the invention encompasses:

at least two contact support components for connection with structural components that are to be propped or supported;

one web plate, which connects the contact support components over their width;

wherein a pair of lengthwise webs running in the longitudinal direction is formed in the web plate, which lengthwise webs are connected by first connecting webs running in the direction of the width;

and wherein a further connecting web is arranged at a section located between the first connecting webs of at least one lengthwise web, i.e. in an area of the lengthwise web that lies between the junction lugs of the further connecting webs on the lengthwise web, which further connecting web extends outwardly in the direction of one of the contact support components, so that a twisting of the lengthwise web takes place in connection with a transverse bending moment acting on the spring component.

Advantageously both the lengthwise webs are connected with each other at their ends respectively by a first connecting web, wherein the further connecting web preferably is arranged at a central section, or rather in the middle of the respective lengthwise web. Thereby, a rectangular web frame is formed between the contact support components for receiving the forces via the further connecting webs. The further connecting web can extend up to the contact support component and form the combination to the contact support component, or it can be connected with a further lengthwise web, which then preferably forms the connection to the contact support component. In this case, an especially strong connection results between the web plate and the bordering contact support component, preferably over the entire length of the further lengthwise web.

Advantageously the web plate has essentially a rectangular shape, wherein preferably the mutual spacing distance of the components is determined by the width of the web plate, and wherein particularly the lengthwise webs and the connecting webs are formed by at least one slot or slit running in a longitudinal direction in the web plate. Thereby, in a simple manner a one-piece web plate can be formed, whereby the danger of cracking and also the costs are reduced since the web plate is manufactured in a simple and rational way. Advantageously the further connecting web is formed by two slots or slits which run toward each other from the free edges of the web plate.

Preferably the contact support components have contact bearing areas which face in opposite directions, wherein the web plate is arranged perpendicularly to the contact bearing areas. Thereby the arising forces can be taken up by the contact bearing areas and the web plate in an advantageous way and an especially high support force is provided in the area of the spring component. The contact bearing areas or rather contact support components can be connected with the components to be supported by clamping, adhesive bonding or bolting. Preferably one or more expansion joints are arranged in the contact support components or rather contact bearing areas for the components, whereby the expansion joints preferably extend in the transverse direction.

Thereby, different heat expansions of the spring component relative to the component with which it is connected are equalized.

Preferably the length l of the lengthwise webs is so chosen that the spring component has the desired transverse bending stiffness, and the width b of the connecting webs and the height h of lengthwise webs can be so chosen, that the spring component has the desired elongation stiffness. Consequently the elastic properties of the spring components can be adjusted through suitable selection of the dimensions of the various webs. In this regard, the width b of the connecting webs is preferably about $\frac{1}{15}$ to $\frac{1}{5}$ of the length l of the lengthwise webs, particularly preferably about $\frac{1}{8}$ to $\frac{1}{4}$ and especially preferably about $\frac{1}{3}$ of the length of the lengthwise webs. The spring component is preferably manufactured of a fiber composite material, whereby a very high support strength and advantageous material properties are achieved together with an especially lightweight construction and low costs.

According to a further aspect of the invention, a support bearing is provided which encompasses a spring component according to the invention. In the support bearing according to the invention, two or more spring components are preferably arranged such that they lie opposite to each other with their contact support components, so as to hold a component therebetween, so that the component is pivotably supported. Therein the component can be a belt of a helicopter tail rotor, which is supported in a sleeve bearing by the spring components. With such a support bearing according to the invention, a high support force for holding or positioning the belt in the control sleeve is achieved, wherein the belt can be twisted in the longitudinal direction relative to the support bearing. Especially the manufacturing costs are reduced in spite of high stability, stable bearing support and long service life.

In the support bearing according to the invention, the spring components can also connect a sensitive structure with a support frame, preferably at three points. Thereby an especially light structure with low strength, which otherwise would be exposed to a great danger of breaking, can be supported in a damped manner and stabilized by a support frame. Therein the support frame can be, for example, a support structure for use in outer space, and the sensitive structure can be a flat structure like, for example, a space mirror or a solar panel.

BRIEF DESCRIPTION OF THE DRAWINGS

In the following, preferred example embodiments of the invention are described in an exemplary manner in connection with drawings in which

FIG. 2b is a plan view of the four bladed tail rotor shown in FIG. 2a;

FIG. 3 schematically represents a cross-section along the line A–A' through the four bladed tail rotor shown in FIG. 2b, in the area of the known elastomer sleeve bearing;

FIG. 4 shows a cross-section through a further known elastomer sleeve support bearing with an arrangement of elastomer bearing components;

FIG. 5a shows a first preferred embodiment of the spring component according to the invention;

FIG. 5b is a front view of the first preferred embodiment of the spring component according to the invention;

FIG. 5c is a side view of the first preferred embodiment of the spring component according to the invention;

FIG. 7a is a front view of a support bearing according to the invention, by means of which a tail rotor belt is positioned in a control sleeve;

FIG. 7b is a side view of the support bearing shown in FIG. 7a;

FIG. 8b is a front view of the spring component shown in FIG. 8a;

FIG. 8c is a side view of the spring component shown in FIG. 8a; and

DETAILED DESCRIPTION OF PREFERRED EXAMPLE EMBODIMENTS AND OF THE BEST MODE OF THE INVENTION

Figure 1:
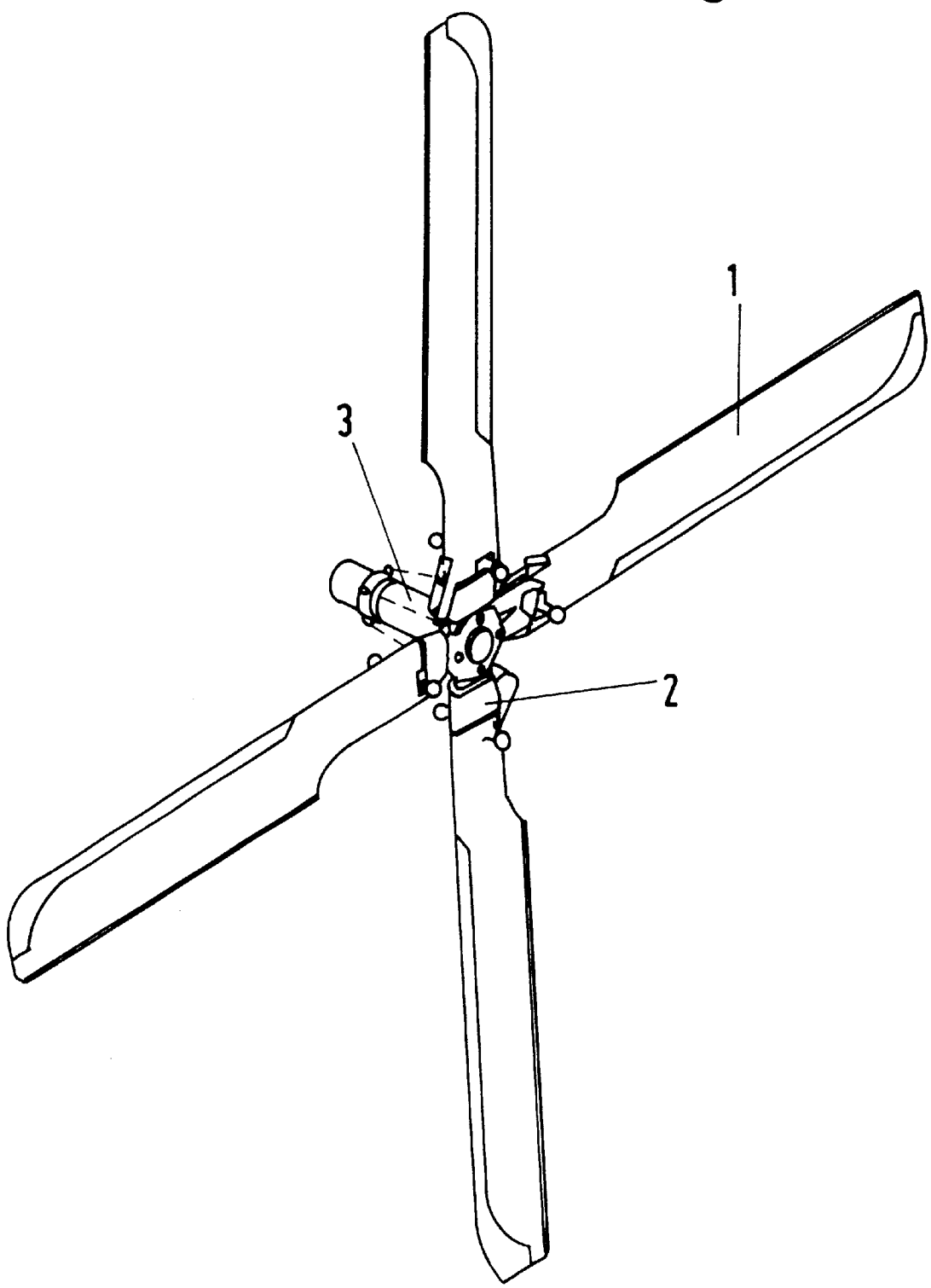
FIG. 1 is a schematic view of a bearingless four bladed tail rotor, in which the spring component according to the invention can be utilized.

FIG. 1 shows a typical bearingless four bladed tail rotor, which is usually equipped with an elastomer-sleeve bearing and according to the present invention is equipped with the support bearing and spring components according to the invention. The tail rotor comprises four rotor blades 1, which are each respectively connected with the rotor mast 3 by a control sleeve 2. The throughgoing belts, which take up the centrifugal and bending forces, are located in the interior of the rotor blades 1.

Figure 2A:
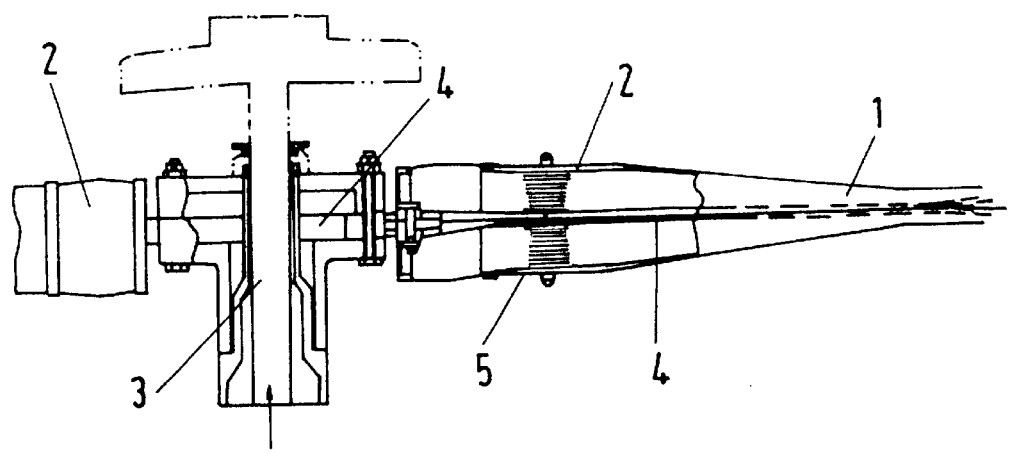
FIG. 2a is a partial section view of a known four bladed tail rotor which comprises a known elastomer-sleeve support bearing.

FIG. 2a shows a partial section through a known four bladed tail rotor. Within the rotor blade 1 and the control sleeve 2, the belt 4 is held by a known elastomer sleeve support bearing 5. In connection with a twisting of the control sleeve 2, the belt 4 remains unchanged in its position in the area of the rotor mast 3, while it is twisted in the area of the control sleeve 2 and the rotor blade 1. Therein a twisting of the belt 4 of up to 25° relative to its position in the area of the rotor mast 3 can take place.

Figure 2B:
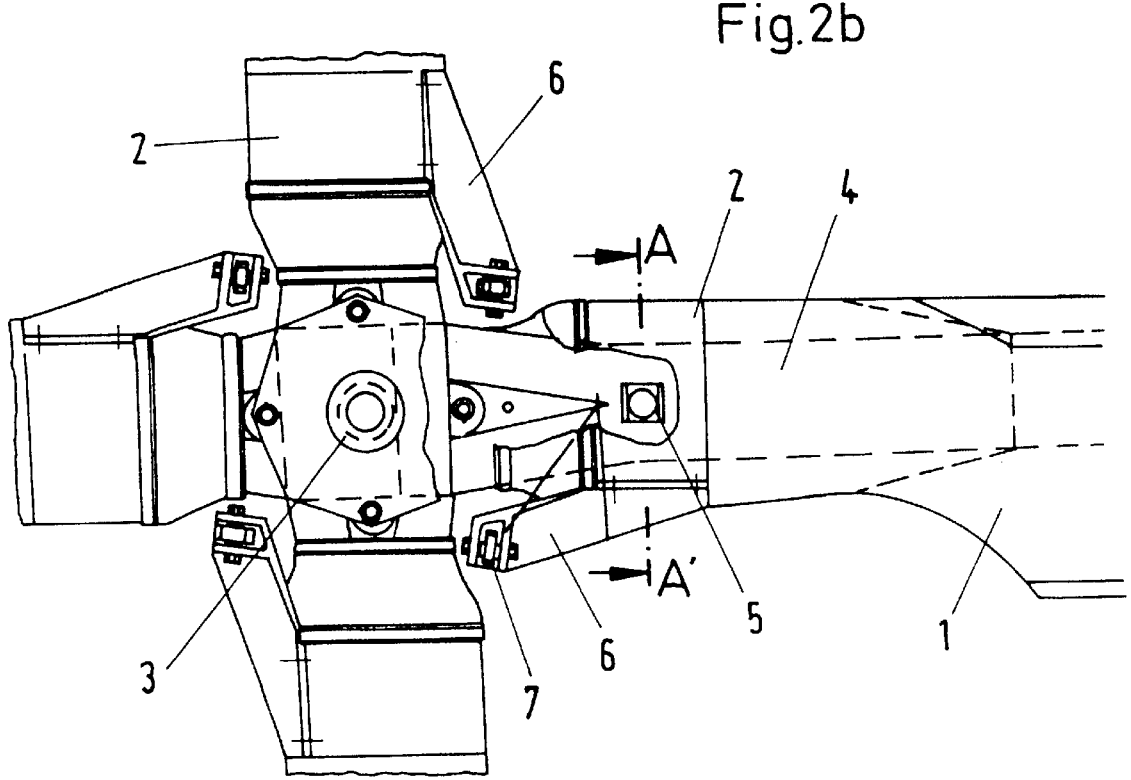

FIG. 2b shows a plan view onto the known arrangement. The control sleeves 2 are respectively twisted or rotated by blade levers 6, which are operated by control rods, which engage onto control rod bearing 7. The belt 4 represented by the dashed lines runs continuously respectively through each of two oppositely lying rotor blades 1 and is supported in its middle in the area of the control sleeve 2 by the elastomer sleeve bearing 5. The cross-section through the known control sleeve along the line A–A' is schematically represented in FIG. 3.

A further known arrangement of known elastomer bearing components in a support bearing is shown in FIG. 4. Therein the belt 4 is held at its both sides by the known elastomer components in the center of the control sleeve. To withstand the high loads, these known elastomer bearings are formed of layers of titanium or steel platelets, between which respectively a layer of rubber is located. The disadvantages of this known bearing assembly were discussed above.

FIGS. 5a to 5c show a first preferred embodiment of the spring component according to the invention, which is used instead of the known elastomer bearing components in the control sleeve 2 of the previously shown helicopter tail rotor, according to the invention, to support or rather hold the belt 4. The spring component 8 has in its central part a support plate or web plate 20 which is provided for taking up the forces between two components spaced from each other, in order to support the components mutually relative to each other or to keep their spacing in the area of the web plate 20 constant. In this context, the width B of the web plate 20 determines the spacing distance between the components. In the longitudinal direction the web plate has the length l so that in the installed condition it extends in the longitudinal direction between the components to be supported. It can be seen from FIG. 5c that the web plate has a rectangular external shape, which is subdivided by rectangular slots or slits 24, 25a, 25b, 26a, 26b into parallel lengthwise webs 21a to d and transverse- or connecting webs 22a, 22b, and 23a, 23b.

In this context the central rectangular slot 24 running in the longitudinal direction of the web plate 20 separates the two lengthwise webs 21a, 21b, which are connected to each other at their ends by the connecting webs 22a, 22b which run perpendicular to the lengthwise webs and extend in the direction of the width of the web plate. Consequently the lengthwise webs 21a, 21b and the connecting webs 22a, 22b form a rectangular flat frame. In a central area of each lengthwise web 21a, 21b or in its middle, respectively a further connecting web 23a or 23b is arranged, which provides the connection to the further neighboring lengthwise webs 21c or 21d. Therein the central connecting webs 23a, 23b are located in the middle between the neighboring lengthwise webs 21a, 21c or 21b, 21d. The central connecting webs 23a and 23b are formed between pairs of lengthwise slots or slits 25a, 25b or 26a, 26b, which extend pairwise inwardly from the free edges of the web plate 20.

FIG. 5a shows, that at both lengthwise side edges of web plate 20 plate shaped contact supports or rather contact support plates 11a, 11b are arranged. Each of these plates 11a, 11b comprises a bearing area 12a or 12b for connection with components that are to be held or supported, or further structural or bearing components. The contact support plates 11a, 11b and the associated bearing areas 12a or 12b are oriented parallel to each other, wherein the bearing areas 12a, 12b are directed in opposite directions. The spring component can, for example, be used in a sleeve support bearing of a helicopter tail rotor in such a way that the bearing area 12a is rigidly connected with an internal surface of the control sleeve 2, and the oppositely lying bearing area 12b is rigidly connected with a side of the belt 4.

The spring component is double-T-shaped, wherein the web plate 20 extends perpendicularly between the contact support plates 11a, 11b which are oriented parallel to each other. Through the special arrangement of the lengthwise webs 21a to d and the connecting webs 22a, 22b and 23a, 23b, the spring component is flexible in the transverse direction. In FIG. 5b the possible bending direction is represented by the two arrows X, X'. In connection with a transverse bending moment $M_{Trans}$ acting on the spring component, which is represented in FIG. 5c in the area of the web plate 20 by the double arrows C, C' according to the right-hand rule, a transformation of the bending moments being transformed to twisting moments takes place in the lengthwise web 21a, 21b or in the center area of the spring component. Therein the lengthwise webs 21a, 21b are twisted along their extension, respectively in the area between the first connecting webs 22a, 22b and the further connecting webs 23a or 23b, lying opposite thereto and arranged shifted or offset thereto.

The transverse bending stiffness of the spring component is influenced essentially by the length l of the lengthwise webs 21a, 21b. The greater the length l of a lengthwise web is, the more easily it can be twisted and the lower is its transverse bending stiffness. The relation between the twist angle ψ and the length l results from the integration of the formula:

$$\varphi' = \frac{M_T}{G \cdot I_T}$$

wherein $\varphi' = \frac{d\varphi}{dx}$ = twist angle per unit length $M_T$ = torsion moment $G$ = shear modulus, and $I_T$ = torsional moment of inertia From the above, the result is:

$$\varphi = \int \frac{M_T}{G \cdot I_T} dx = \frac{M_T}{G \cdot I_T} \cdot l$$

Consequently it is possible to achieve the respectively desired or optimum transverse bending stiffness of the spring component by a suitable selection of the length l of the lengthwise webs 21a, 21b.

The transverse elongation stiffness or elasticity coefficient, or rather the support strength of the spring component is essentially influenced by the width b of the connecting webs 23a, 23b and by the height h of the lengthwise webs 21a, 21b. Through suitable selection of the parameters b and h, the spring component is provided with the desired or optimum transverse elongation stiffness or elasticity coefficient and support strength. Consequently this provides a transversely softly flexible support bearing or spring component with the possibility of influencing the stiffness by selection of the dimensions, and particularly the length l of the lengthwise webs or the length L of the spring component.

Figure 6:
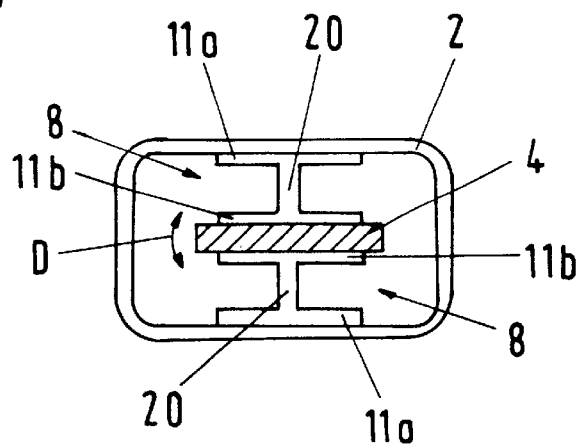
FIG. 6 schematically shows a cross-section through a support bearing of a helicopter tail rotor.

FIG. 6 schematically shows a cross-section through a sleeve-support bearing according to the invention in the area of the control sleeve 2 of a bearingless helicopter tail rotor, as shown in FIG. 1 for example. Therein the control sleeve 2 forms a hollow space in its interior. In the center of this hollow space, the belt 4 is positioned by two spring components according to the invention. The spring components 8 prop or support the belt 4 from both sides relative to the internal wall of the control sleeve 2. The contact support plates 11a of the spring components 8 are joined with control sleeve 2 by an adhesive and/or by bolting, and the contact support plates 11b of the spring components 8 are joined by an adhesive and/or by bolting with a surface of the belt 4. Through such a support of the belt 4 between two spring components 8, a redundancy is attained, i.e. upon the failure of the function of one spring component, for example due to material fatigue or breaking, the belt 4 remains positioned rigidly in the control sleeve 2 by the effect of the second spring component.

The web plates 20 of the spring components 8 are oriented perpendicular to the belt 4 and are joined and begin at the center of the belt 4. Due to the transverse flexibility of the spring components 8, a twisting of the belt 4 around its longitudinal axis within the control sleeve 2 is possible. The twist movement is shown by the double arrows D in FIG. 6.

Figures 7A, 7B:
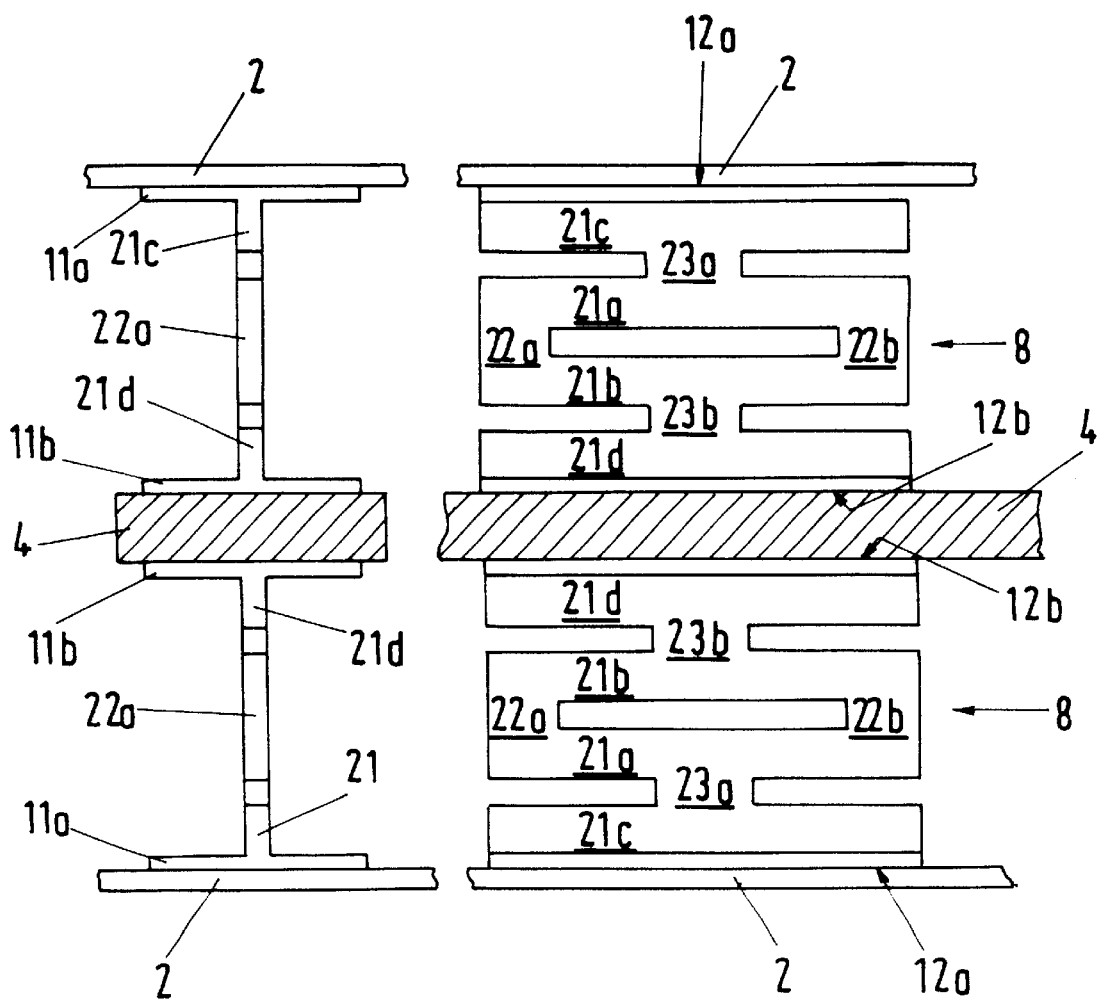

FIGS. 7a and 7b show enlarged sections of the front view and the side view of the support bearing according to the invention. The two spring components 8 are arranged symmetrically on both sides of the belt 4 of the tail rotor and hold this belt 4 between their oppositely positioned contact bearing areas 12b. Therein the respective support walls of the control sleeve 2, the contact bearing areas 12a and 12b of the spring components 8 and the support areas on the tail rotor belt 4 are oriented parallel to each other. The sleeve support bearing or the spring components according to the invention are manufactured out of a fiber composite material, whereby the lightest possible construction is achieved. It is also contemplated, however, to produce them of metal, for example.

Figure 8A:
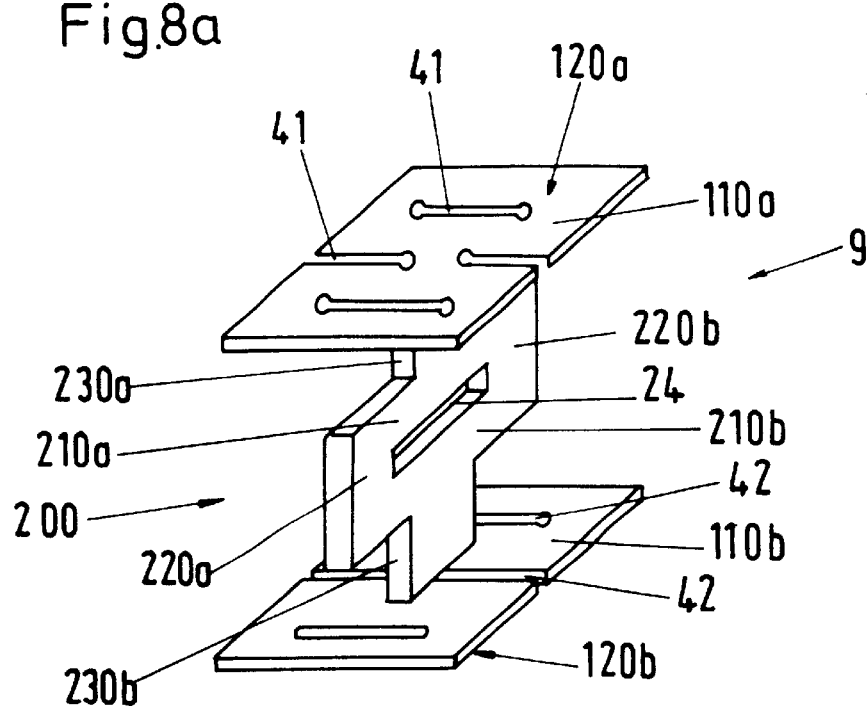
FIG. 8a shows a further embodiment of the spring component according to the invention.

FIG. 8a shows a further embodiment of the spring components according to the invention. In this embodiment the web plate 200 is provided with contact support plates 110a, 110b, of which the respective outside lying sides are embodied as contact bearing areas 120a, 120b in which rectangular expansion joints 41 or 42 are arranged extending in the transverse direction of the spring component. Through the expansion joints 41, 42, it is achieved that different thermal expansion coefficients of the spring component 9 and of the component, with which it is connected do not lead to stresses or cracks or to a loosening of the connection. Through the expansion joints 41, 42, the spring component 9 can match any arising relative movements between the components or between the components and the support bearing.

The web plate 200 comprises only two lengthwise webs 210a and 210b of which the ends are joined by connecting webs 220a and 220b. The further connecting webs 230a and 230b, which respectively join and begin at the center of a lengthwise web 210a, 210b, are connected directly with the contact support plates 110a or 110b, without further lengthwise webs being located between the further connecting webs 230a, 230b and the contact support plates 110a or 110b. Consequently the web plate 200 has the shape of a wide, flat cross, of which the cross-bar is subdivided by a slot into two parallel extending areas or plates or webs.

Figure 8B:
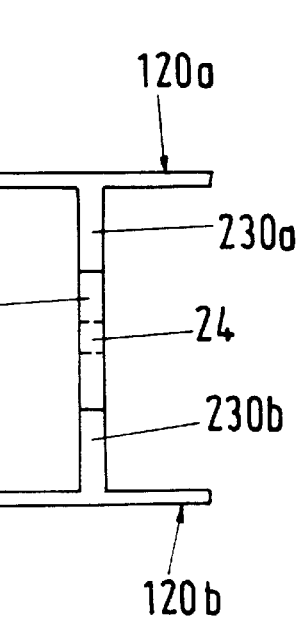
Figure 8C:
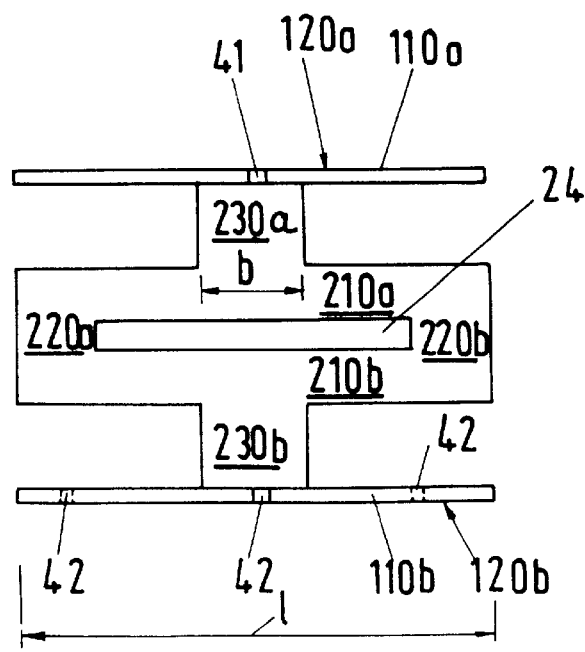

FIGS. 8b and 8c show the spring component 9 according to the second embodiment in a front and a side view. The ratio of the width b of the connecting webs 23a, 23b relative to the length l of the lengthwise webs is about 1:5, wherein in general a range of 1:4 to 1:8 is especially preferred. The spring element can be lengthened in the longitudinal direction, in order to optimally match the ratio of the width b of the connecting webs 23a, 23b relative to the length L of the spring element 9 or relative to the length l of the lengthwise webs 21a, 21b. Thereby the stiffness of the spring component can be optimally matched by selection of the dimensions, for example in the longitudinal direction. The expansion joints 41 and 42 make possible a better connection to the tail rotor belts, which are elongated, for example by strong centrifugal and/or bending forces, wherein the connection can be achieved by adhesive bonding, clamping or bolting.

Figure 9:
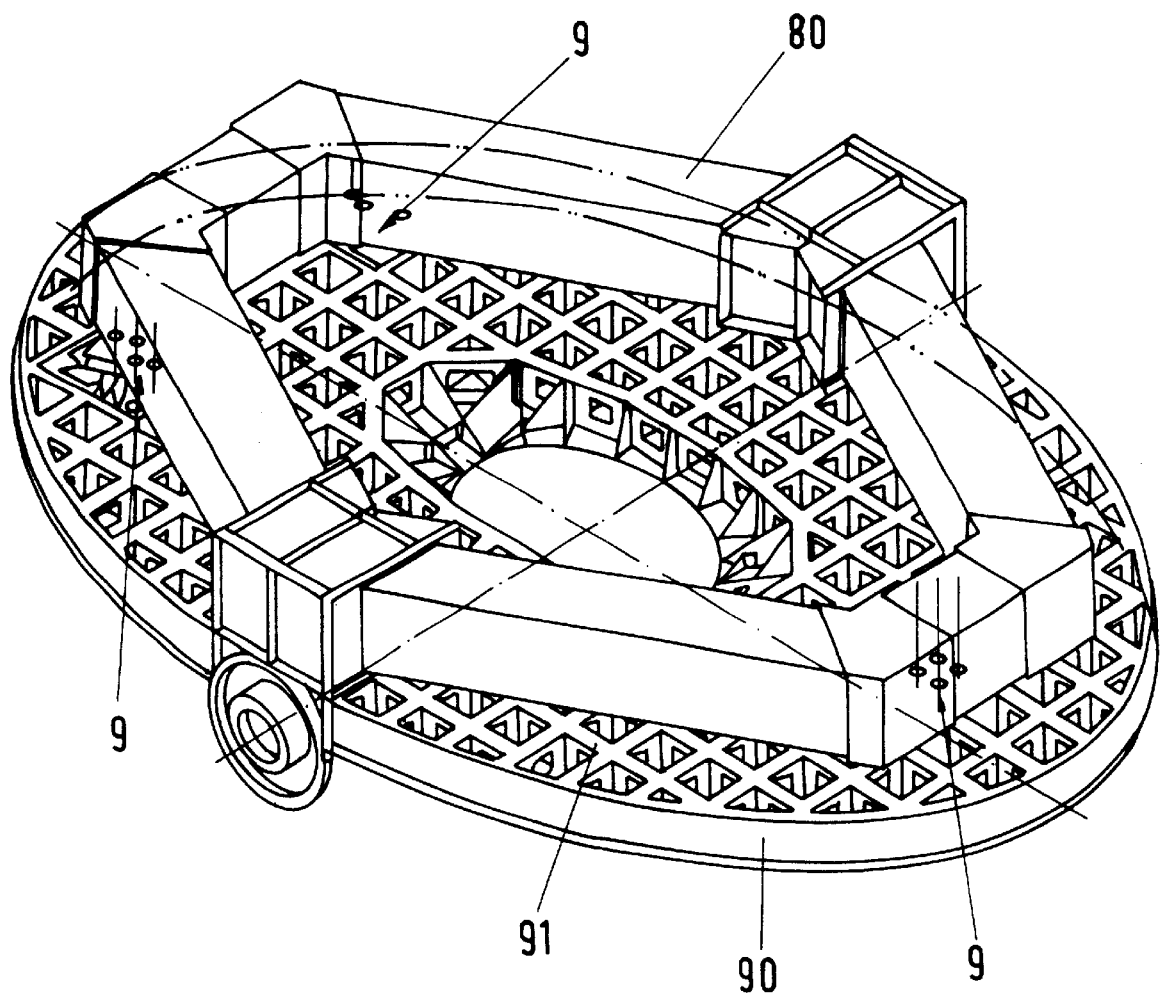
FIG. 9 is a representation of a space mirror which is connected with a support structure.

FIG. 9 shows a high accuracy space mirror with a frame support structure. The frame support structure 80 is reinforced with high modulus carbon fiber and the mirror 90 comprises reinforcement ribs 91 on its backside, whereby these ribs are shaped in a honeycomb fashion. The mirror comprises a SIC—infiltrated carbon fiber composite structure. The frame support structure 80 is connected with the mirror 90 by three spring components 9 according to the invention, as they were discussed above. By means of the transversely flexible and thrust rigid spring components as connecting components, even small relative movements between the frame support structure 80 and the mirror 90 can be equalized. Thereby also an S-shaped bending of the web plate 20 or 200 over its width is possible, so that a mutual offset of both components to be joined can take place transversely to the web plate, without causing breaks, cracks or other impairments in the spring components or the parts connected thereto. The connection between the frame support structure 80 and the mirror 90 through the spring component 9 according to the invention takes place at three points, through which a stress free, stable support of the mirror 90 on the frame support structure 80 is possible.

The rectangular or quadrangular contact support plates 110b of the spring components 9 are fitted into the honeycomb hollow spaces, which are formed between the reinforcement ribs 91. Through the slots or expansion joints 42 arranged in the contact support plates 110b, which are oriented transverse to the web plate 200 in the present case, a change of the dimensions of the individual honeycomb hollow spaces, which for example arises due to temperature changes, can be equalized.

With the present invention, spring components and support bearings are provided, which withstand high loads over a long period of time, which have a high transverse bending flexibility with a strong transverse elongation rigidity or stiffness and supporting force, and moreover which can be manufactured in a simple and cost effective way.

Expensive or complex structural or contact support components in the field of aeronautics and astronautics technology can be replaced in a cost effective manner, wherein weak points are avoided and a durable secure support of movable components, which are subjected to strong loads, is made possible. The spring components 8, 9 according to the invention, in comparison to the known elastomer bearings, comprise the advantage that they can be used in outer space. The spring components 8, 9 according to the invention comprise a high supporting force and an especially favorable ratio of the stiffness and they make it possible to achieve a drastic reduction of the manufacturing costs of bearingless helicopter tail rotors.

The invention is, however, not limited to spring components and support bearings in the area of helicopter tail rotors or space travel mirrors or outer space structures. It makes possible in general a supporting and damping support of components, which carry out oscillating movements or relative movements in relation to a mounting structure, wherein the mutual spacing distance of the structural components or bearing components remains constant and a high supporting force is guaranteed.

What is claimed is:

1. A spring component for a support bearing for supporting two structural members relative to each other, said spring component comprising:
    first and second contact support components adapted to be connected respectively individually to the two structural members; and
    a web plate that connects said contact support components to each other, and that has a width spanning in a widthwise direction between said contact support components and a length extending in a longitudinal direction;
    wherein said web plate includes first and second lengthwise webs that extend in said longitudinal direction, and first connecting webs that extend in said widthwise direction and that connect said lengthwise webs to each other;

wherein said web plate further includes a first further connecting web extending outwardly in said widthwise direction toward said first contact support component from a portion of said first lengthwise web located between said first connecting webs; and wherein said spring component is configured and arranged so that a transverse bending moment acting on said spring component between the first and second structural members will cause a twisting of at least one of said lengthwise webs.

2. The spring component according to claim 1, wherein one of said first connecting webs connects respective first ends of said first and second lengthwise webs to each other, another of said first connecting webs connects respective second ends of said first and second lengthwise webs to each other, and said portion of said first lengthwise web from which said first further connecting web extends is at a middle of said first lengthwise web between said first end and second end thereof.

3. The spring component according to claim 1, wherein said first further connecting web is connected to said first contact support component and forms a direct connection between said first lengthwise web and said first contact support component.

4. The spring component according to claim 3, wherein said web plate further includes a second further connecting web extending outwardly in said widthwise direction toward said second contact support component from a portion of said second lengthwise web located between said first connecting webs, and wherein said second further connecting web is connected to said second contact support component and forms a direct connection between said second lengthwise web and said second contact support component.

5. The spring component according to claim 1, wherein said web plate further includes a first further lengthwise web that extends in said longitudinal direction and that is connected to said first contact support component, and wherein said first further connecting web is connected to said first further lengthwise web, such that said first further connecting web and said first further lengthwise web together form a connection between said first lengthwise web and said first contact support component.

6. The spring component according to claim 5, wherein said web plate further includes a second further lengthwise web that extends in said longitudinal direction and that is connected to said second contact support component, wherein said web plate further includes a second further connecting web extending outwardly in said widthwise direction toward said second contact support component from a portion of said second lengthwise web located between said first connecting webs, and wherein said second further connecting web is connected to said second further lengthwise web, such that said second further connecting web and said second further lengthwise web together form a connection between said second lengthwise web and said second contact support component.

7. The spring component according to claim 1, wherein said web plate has an essentially rectangular shape, and wherein said lengthwise webs and said first connecting webs are at least partially bounded and separated from each other by a slot extending in said longitudinal direction in said web plate between said lengthwise webs and between said first connecting webs.

8. The spring component according to claim 1, wherein said first further connecting web is bounded by two slots that extend toward each other in said longitudinal direction along said first lengthwise web respectively from opposite ends of said web plate.

9. The spring component according to claim 1, wherein said contact support components respectively comprise bearing areas which respectively face opposite each other and which are respectively adapted to contact the structural members, and wherein said bearing areas extend perpendicularly relative to said web plate.

10. The spring component according to 1, wherein said contact support components have at least one expansion gap therein.

11. The spring component according to claim 10, wherein said expansion gap extends in a transverse direction perpendicular to said longitudinal direction in a plane of said contact support component respectively having said expansion gap.

12. The spring component according to claim 1, wherein said lengthwise webs have a length in said longitudinal direction that is selected so that said spring component has a desired transverse bending stiffness.

13. The spring component according to claim 1, wherein said further connecting web has a width in said longitudinal direction and said lengthwise webs have a height in said widthwise direction, and wherein said width and said height are selected so that said spring component has a desired elongation stiffness.

14. The spring component according to claim 1, wherein said lengthwise webs have a length in said longitudinal direction, said further connecting web has a width in said longitudinal direction, and said width corresponds to $1/15$ to $1/3$ of said length.

15. The spring component according to claim 14, wherein said width corresponds to $1/8$ to $1/4$ of said length.

16. The spring component according to claim 14, wherein said width corresponds to $1/5$ of said length.

17. The spring component according to claim 1, wherein said spring component consists of a fiber composite material.

18. A support bearing arrangement comprising a first one of said spring component according to claim 1, a first structural member connected to said first contact support component of said first spring component, and a second structural member connected to said second contact support component of said first spring component.

19. The support bearing arrangement according to claim 18, further comprising a second one of said spring component, wherein said first contact support component of said second spring component is arranged facing said first contact support component of said first spring component with said first structural member therebetween, and wherein said first contact support component of said second spring component is connected to said first structural member, so that said first structural member is pivotally supported relative to said second structural member.

20. The support bearing arrangement according to claim 18, wherein said first structural member is a belt of a helicopter tail rotor blade, and said second structural member is a control sleeve of said helicopter tail rotor blade.

21. The support bearing arrangement according to claim 18, wherein said second structural member is a support frame, and said first structural member is a sensitive structure that is to be supported relative to said support frame.

22. The support bearing arrangement according to claim 21, further comprising second and third ones of said spring components, wherein said second and third spring components are each respectively connected to said sensitive structure and to said support frame at respective locations displaced from each other and from a location of said first spring component.

23. The support bearing arrangement according to claim 21, wherein said support frame is a support frame of a spacecraft, and said sensitive structure is a flat planar structure.

24. The support bearing arrangement according to claim 23, wherein said flat planar structure comprises a mirror or a solar panel.

* * * * *